United States Patent
Suitts et al.

(10) Patent No.: US 8,966,371 B2
(45) Date of Patent: Feb. 24, 2015

(54) METADATA FOR PROVIDING MEDIA CONTENT

(75) Inventors: Jason Robert Suitts, San Francisco, CA (US); James Felix Black, San Francisco, CA (US); Jonathan James Currey, San Francisco, CA (US); Max Muller, III, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1599 days.

(21) Appl. No.: 11/519,995

(22) Filed: Sep. 11, 2006

(65) Prior Publication Data

US 2008/0065691 A1  Mar. 13, 2008

(51) Int. Cl.
| G06F 17/00 | (2006.01) |
| H04N 21/2343 | (2011.01) |
| H04N 21/84 | (2011.01) |
| H04N 21/44 | (2011.01) |
| H04N 21/845 | (2011.01) |

(52) U.S. Cl.
CPC ......... *H04N 21/23439* (2013.01); *H04N 21/84* (2013.01); *H04N 21/234309* (2013.01); *H04N 21/44012* (2013.01); *H04N 21/8456* (2013.01)
USPC .......................................... 715/723; 725/61

(58) Field of Classification Search
CPC .................. H04N 21/23439; G06F 17/30017; H04L 65/4084
USPC ........................ 707/104.1; 715/723; 725/61
See application file for complete search history.

(56) References Cited

U.S. PATENT DOCUMENTS

| 5,130,792 | A | 7/1992 | Tindell et al. |
| 5,553,221 | A * | 9/1996 | Reimer et al. ............... 715/720 |
| 5,553,281 | A * | 9/1996 | Brown et al. ............. 707/104.1 |
| 5,805,804 | A | 9/1998 | Laursen et al. |
| 5,963,916 | A | 10/1999 | Kaplan |
| 6,226,672 | B1 | 5/2001 | DeMartin et al. |
| 6,418,473 | B1 | 7/2002 | St. Maurice et al. |
| 6,944,585 | B1 * | 9/2005 | Pawson ........................ 703/22 |
| 2002/0065925 | A1 * | 5/2002 | Kenyon et al. ............... 709/231 |
| 2003/0187863 | A1 * | 10/2003 | Kohut et al. ................. 707/102 |
| 2003/0206596 | A1 * | 11/2003 | Carver et al. ........... 375/240.26 |
| 2004/0003097 | A1 * | 1/2004 | Willis et al. ................. 709/228 |
| 2006/0149781 | A1 * | 7/2006 | Blankinship .............. 707/103 R |
| 2007/0067340 | A1 * | 3/2007 | Lakamp et al. ........... 707/104.1 |
| 2007/0130007 | A1 * | 6/2007 | Haberman et al. ............. 705/14 |

OTHER PUBLICATIONS

Global Media Downloads Liquid Audio for Internet Distribution. Business Wire, Oct. 22, 1998. LookSmart: http://www.findarticles.com/p/articles/mi_m0EIN/is_1998_OCt_22/ai_53113068.

* cited by examiner

*Primary Examiner* — Jensen Hu
(74) *Attorney, Agent, or Firm* — Novak Druce Connolly Bove + Quigg LLP

(57) ABSTRACT

Providing digital media content is disclosed. A metadata file and a plurality of data files are received. The metadata file is used to process the plurality of data files. The processing of the plurality of data files using the metadata file is performed without human intervention to provide a downloadable digital media content asset.

20 Claims, 6 Drawing Sheets

/ 402

```
<type>film</type>
<title>Movie Title</title>
<ratings>
        <rating system="mpaa" reason="Drug content">PG-13</rating>
</ratings>
<cast>
        <actor name="Bob" artist_id="x" billing="top">Male Lead</actor>
        <actor name="Mary" artist_id="y" billing="top">Female Lead</actor>
        <actor name="Joe" artist_id="z">Supporting Actor</actor>
</cast>
<crew>
        <member name="Rob" artist_id="w" billing="top">Director</member>
</crew>
<synopsis>"Synopsis Text"</synopsis>
```

```
<assets>
    <asset type="full">
        <data_file role="source">
            <file_name>datafile1</file_name>
            <checksum type="md5">a</checksum>
        </data_file>
        <data_file role="chapters">
            <file_name>datafile2</file_name>
            <checksum type="md5">b</checksum>
        </data_file>
        <data_file role="subtitle">
            <file_name>datafile3</file_name>
            <checksum type="md5">c</checksum>
        </data_file>
        <data_file role="audio">
            <file_name>datafile4</file_name>
            <checksum type="md5">d</checksum>
        </data_file>
        <data_file role="captions">
            <file_name>datafile5</file_name>
            <checksum type="md5">e</checksum>
        </data_file>
    </asset>
    <asset type="preview">
        <data_file role="source">
            <file_name>datafile6</file_name>
            <checksum type="md5">f</checksum>
        </data_file>
    </asset>
</assets>
```

```
<products>
    <product>
        <territory>world</territory>
        <wholesale_price_tier>3</wholesale_price_tier>
        <preorder_sales_start_date>2006-02-10</preorder_sales_start_date>
        <sales_start_date>2006-03-12</sales_start_date>
        <sales_end_date></sales_end_date>
        <cleared_for_sale>true</cleared_for_sale>
    </product>
</products>
```

FIG. 4C

METADATA FOR PROVIDING MEDIA CONTENT

BACKGROUND OF THE INVENTION

Digital media service providers distribute media content products to users. For example, the digital media service provider makes media content products available for rental, purchase, and/or free distribution. The digital media service provider is able to fulfill a request for a user desired media content product by handling digital rights management of the desired media content product, associated billing transaction, if any, and delivery of the desired media content product to the user. Often media content providers, such as recording labels/distributors, movie studios/distributors, and media content creators, provide the media content to a third party digital media service provider by providing one or more files to the digital media service provider. Traditionally for a single media content product, a single file containing the playable content (e.g., a feature film) of the media content product is provided to the digital media service provider. However, under this approach any modification to a single component of the media content product (e.g., addition, deletion, or replacement of an alternate audio track, e.g., in a foreign language) requires the media content provider to produce again the single media content file by incorporating the modification and uploading again the entire single media content file (containing even the unmodified components) to the digital media service provider. Therefore, there exists a need for a way to more flexibly manage media content provided to a digital media service provider.

BRIEF DESCRIPTION OF THE DRAWINGS

Various embodiments of the invention are disclosed in the following detailed description and the accompanying drawings.

FIGS. 4A-4C are illustrating an example of meta-language tag elements and corresponding data contained in a metadata file that can used to produce one or more digital media content assets.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing digital media content is disclosed. In some embodiments, a metadata file and a plurality of data files that can be used to produce a digital media product is received from a content provider. The metadata is used to process the plurality of data files without human intervention to provide a downloadable digital media content asset.

Figure 1:
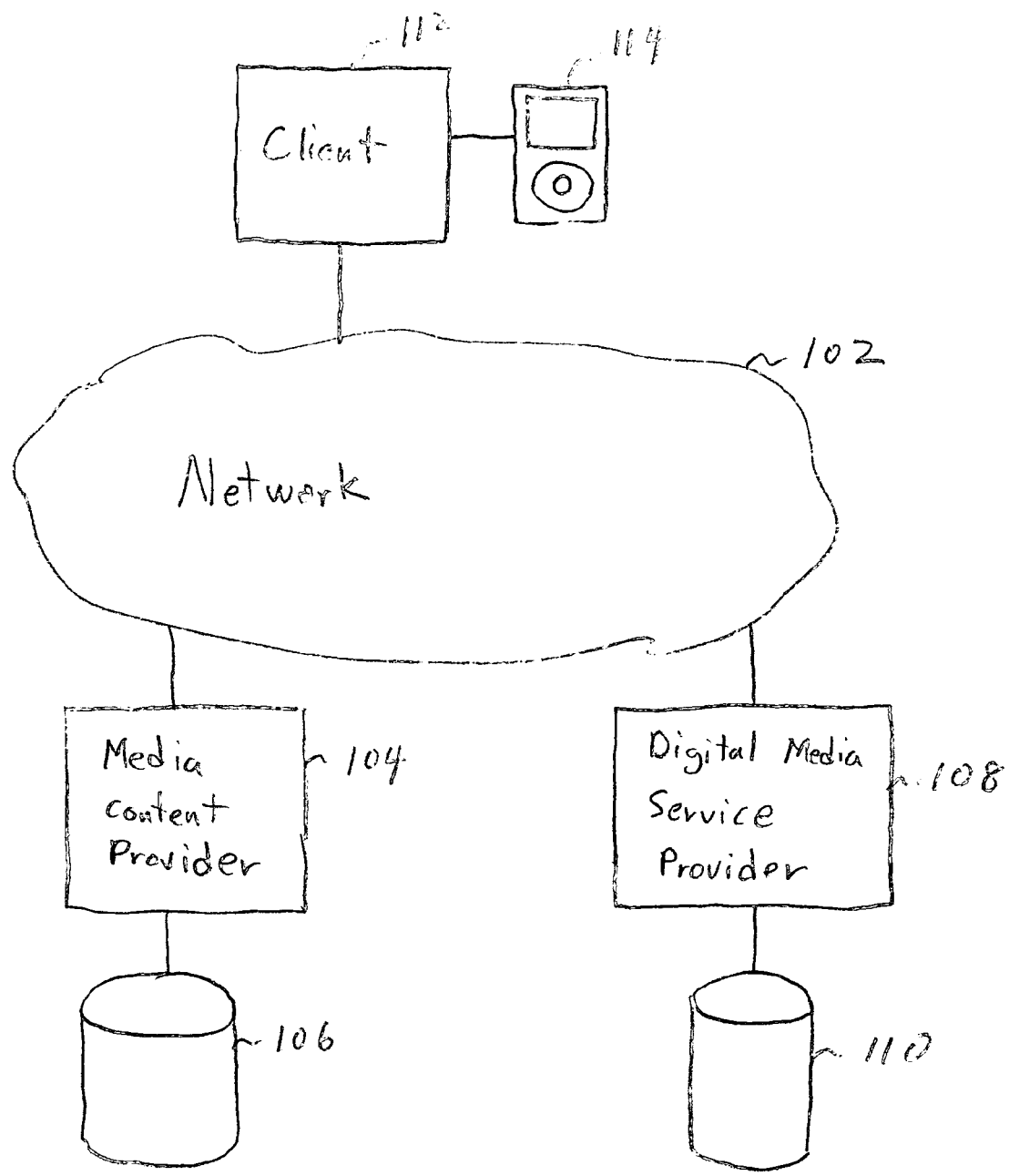
FIG. 1 is a block diagram illustrating an embodiment of a digital media content environment.

FIG. 1 is a block diagram illustrating an embodiment of a digital media content environment. Media content provider 104, digital media service provider 108, and client 112 are connected together through network 102. Network 102 comprises a public or private network and/or combination thereof, for example an Ethernet, serial/parallel bus, intranet, Internet, NAS, SAN, LAN, WAN, and other forms of connecting multiple systems and/or groups of systems together. Any number clients, media content providers, and digital media service providers may be connected to network 102. Digital media content includes any content data capable of being rendered and perceived by one or more senses, including without limitation digital audio, video, image, text, and/or interactive content. Music, audio book, music video, movie, recorded television programming, podcast, video podcast, and playlist are examples of digital media content products. Digital media service provider 108 makes media content products available for rental, purchase, and/or free distribution, e.g., by download via network 102, to client 112. Media content product obtained by client 112 can be used by portable media device 114, such as the IPOD from APPLE COMPUTER, INC. of Cupertino, Calif. For a given digital media product, the digital media service provider in some embodiments handles digital rights management of the media content product (i.e., enforcing limits on the use and/or further distribution of the downloaded digital media content), associated billing transaction, if any, and delivery of the desired media content product to the user. In some embodiments, at least a portion of the media content product is provided as a playable file and/or streamed to the client. Media content provider 104 provides content of a media content product to digital media service provider 108. For example, media content provider 104 uploads media content to digital media service provider 108. Storage 106 is used by media content provider 104 to store media content. Storage 110 is used by digital media service provider 110 to store content provided by media content provider 104.

When media content provider 104 provides the media content for the media content product, a metadata file and a plurality of data files that can be used to produce a digital media content asset is provided. A digital media content asset in some embodiments is included in one or more digital media content products made available for purchase/rental by users. In some embodiments, a digital media content product may include two or more assets. For example, a digital movie product in some embodiments includes two assets, one asset containing the feature film of the movie and another content containing a trailer of the movie. In some cases, a single asset may be produced using a plurality of data files received from a media content provider. For example, in some embodiments a feature film asset is produced from processing and combining the following: a file containing the video and primary audio of the movie, a file containing a multi-channel audio track of the movie, a file containing subtitles and subtitle placement information, and a file containing chaptering information of the movie (e.g., a data file indicating chapter markings and corresponding images/clips for each chapter). In some embodiments, by having the media content provider provide separate components of the asset as a plurality of files rather than an already combined asset as a single file, the digital media service provider retains flexibility in managing and producing the media content asset as desired. For example, the digital media service provider is able to produce various versions of the asset, such as a version for playing on a computer application (e.g., a version optimized for the computer application), a version for playing on a television (e.g., a version containing television closed captioning information), and another different version for playing on a portable media player (e.g., a storage space and/or processing and/or power usage efficient version). In another example, by enabling the digital media service provider to process the components of the asset, the media content provider is able to update a single component of the digital media content asset by only providing the updated component rather having to provide the entire asset. With the provided updated component of the asset, the digital media service provider is able to produce the updated asset by using the updated component and one or more previously provided content files for the unchanged components of the asset.

Figure 2:
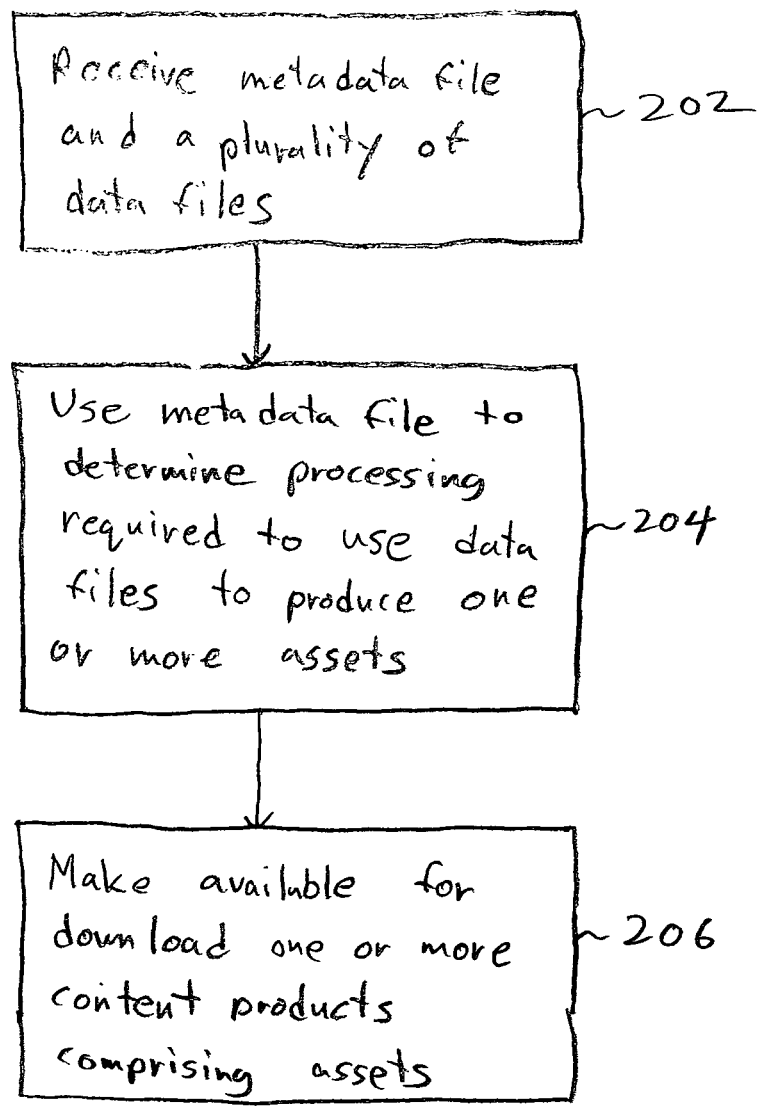
FIG. 2 is a flowchart illustrating an embodiment of a process for producing one or more digital media content assets.

FIG. 2 is a flowchart illustrating an embodiment of a process for producing one or more digital media content assets. In some embodiments, the process of FIG. 2 is implemented by digital media servicer provider 108 of FIG. 1. At 202, a metadata file and a plurality of data files are received. The metadata file and the plurality of data files may be received all at once or received in installments. For example, one or more of the data files is a previously received data file. In some embodiments, the metadata file and the plurality of data files are contents of a single directory. In some cases, the metadata file and the plurality of data files are a subset of data received from a media content provider, such as media content provider 104 of FIG. 1. For examples, in some embodiments the metadata file and associated data files of a first feature film may be included in a package of files for a plurality of films. The metadata file includes one or more of the following: identification information of a digital media product, information describing one or more aspects of a digital media product, information associated with sale/distribution of a digital media product, identification of the plurality of data files, data associating together one or more of the plurality of data files, information that can be used to produce one or more digital media content assets from the data files, and various other media content associated information. In various embodiments, the metadata file is encoded in a meta-language, such as Extensible Markup Language (XML). In some embodiments, each of the data files is associated with a component of a digital media content asset. Examples of the received data files include a video file (including video and a primary audio track, e.g.), an audio file, a text/metadata file indicating chaptering/sectioning of media content, an image file (e.g, preview image of a chapter/section), a file including closed captioning information, and a file including subtitling information.

At 204, the metadata file is used to determine processing required to use the received data files to produce one or more digital media content assets. In some embodiments, multiple data files may be used to produce a single asset. In some embodiments, the metadata file indicates which data file(s) is/are to be used to produce which asset(s). In various embodiments, the determining and/or performing the processing is performed at least in part without human intervention, e.g. by parsing the metadata file and transforming and/or combining data files, as appropriate, without human intervention, based at least in part on the metadata in the metadata file. In some embodiments, the processing includes combining together two or more of the data files to produce a digital media content asset in a manner specified by the metadata file. One or more of the data files may be individually processed (e.g., file format conversion, individual component/file encryption) before being combined to produce the asset. In some embodiments, at least one of the received data files is another metadata file. For example, metadata information contained in one of the received data files in some embodiments specifies a division of the media content into sections (e.g., chapters) and for each chapter identifies a corresponding data file comprising an associated image or video clip intended to be displayed, e.g., to represent the contents of that chapter, for example to facilitate user identification and selection of a desired chapter. In some embodiments, it is not necessarily the case that all of the received data files will be used, at least initially, to create the assets. A received data file can be stored for future use. For example, if closed captioning were not yet supported, in some embodiments closed caption data may still be received and stored for anticipated and/or possible future use. In some embodiments, the processing of 204 is performed more than once to create different versions of the assets. For example, in the case of a feature film for which the primary audio track is in English, different versions may be produced for download to users in a variety of countries/regions in which the primary or a prevalent language is a different non-English language, with each respective version having a second audio track in the corresponding non-English language (e.g., Spanish in Central and South America and French in France and French-speaking African nations).

In some embodiments, the processing of 204 is repeated when the metadata file and/or one or more of the data files used to create the asset is uploaded, modified, replaced, added, or removed. The latter approach enables a media content provider to modify aspects/portions of the content without having the reproduce and upload an integrated file including the updated content and the content that has not changed. Instead, the DSP uses the previously received and stored content that has not changed and any new data files, along with the original or updated metadata file, as applicable, to regenerate the integrated digital media content asset(s).

At 206, one or more content products including one or more of the assets is made available for download. The content product download (e.g., file download or content streaming) is associated with content product rental, purchase, and/or distribution. In some embodiments, the content product is made available for download using the received metadata. For example, one or more of the following is at least in part determined using information contained in the metadata file: a description of the media content product, a distribution authorization confirmation, a purchase price, a sale start date, a sale end date, a pre-sale date, a release date, and a distribution area.

Figure 3:
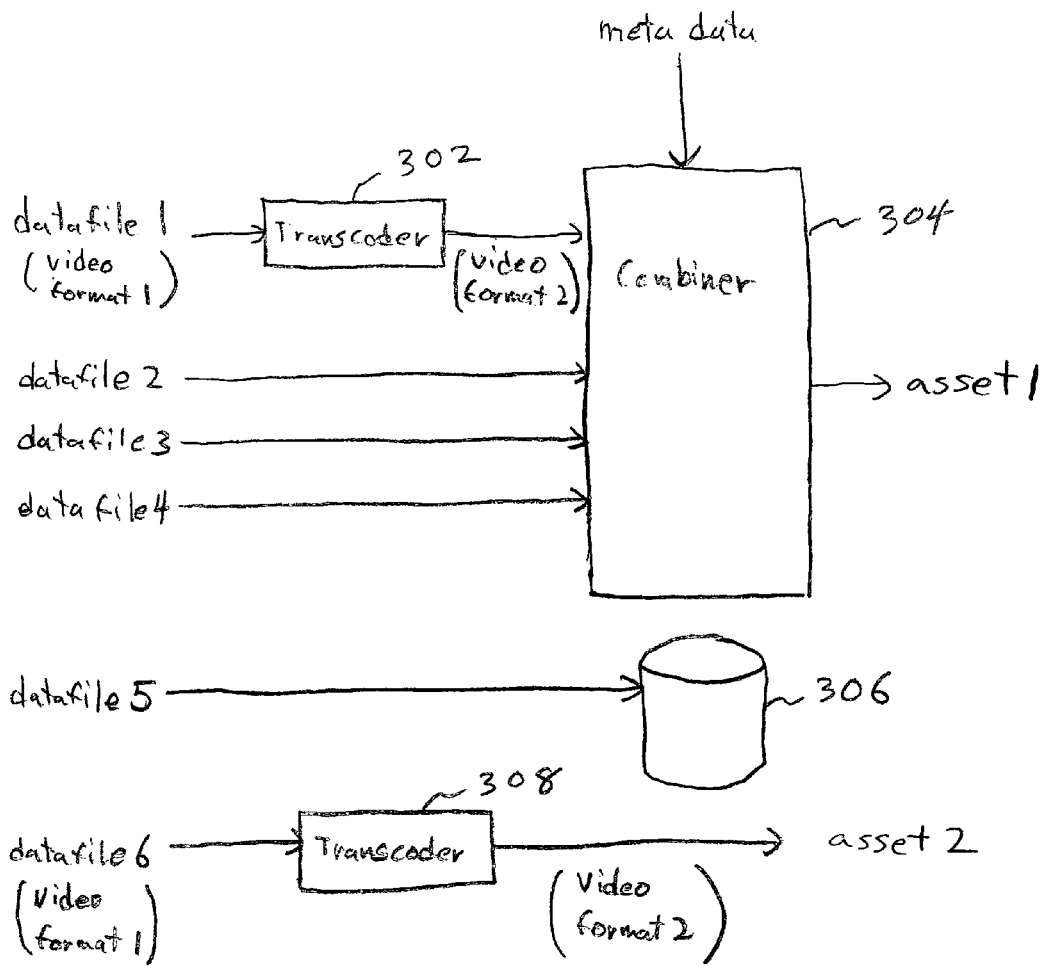
FIG. 3 is a block diagram illustrating an embodiment of processing provided metadata file and data files of a digital media content product to produce digital media content assets.
Figure 1:
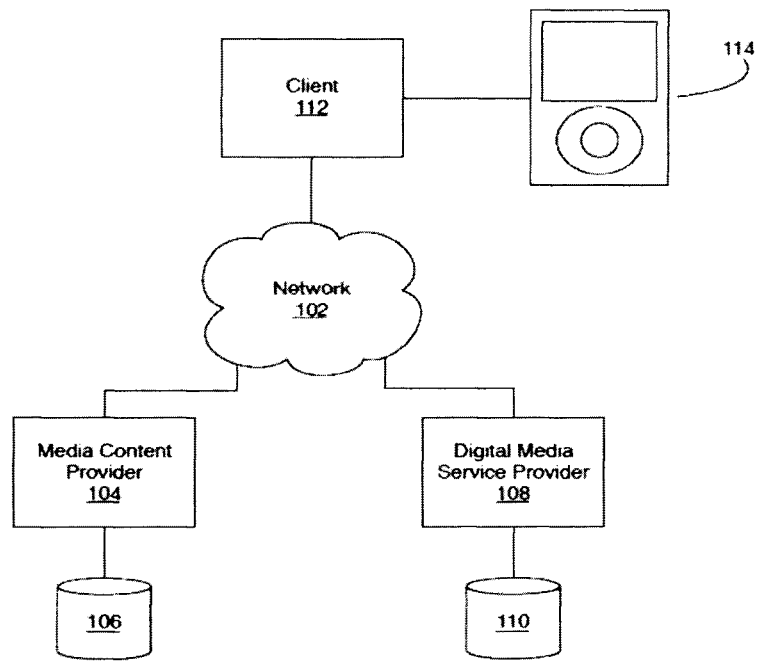
Figure 2:
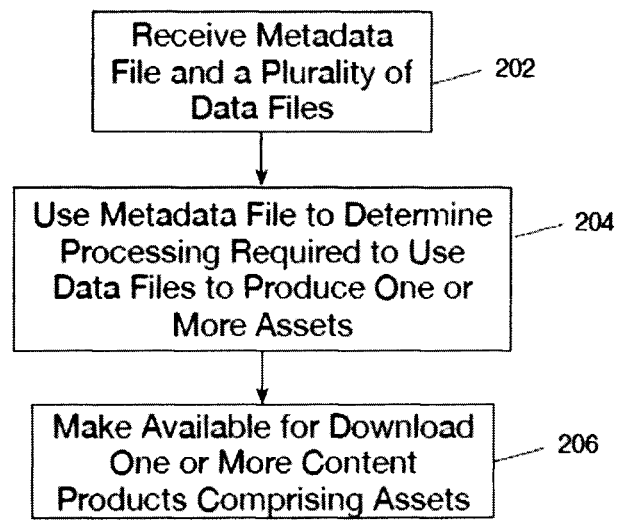
Figure 3:
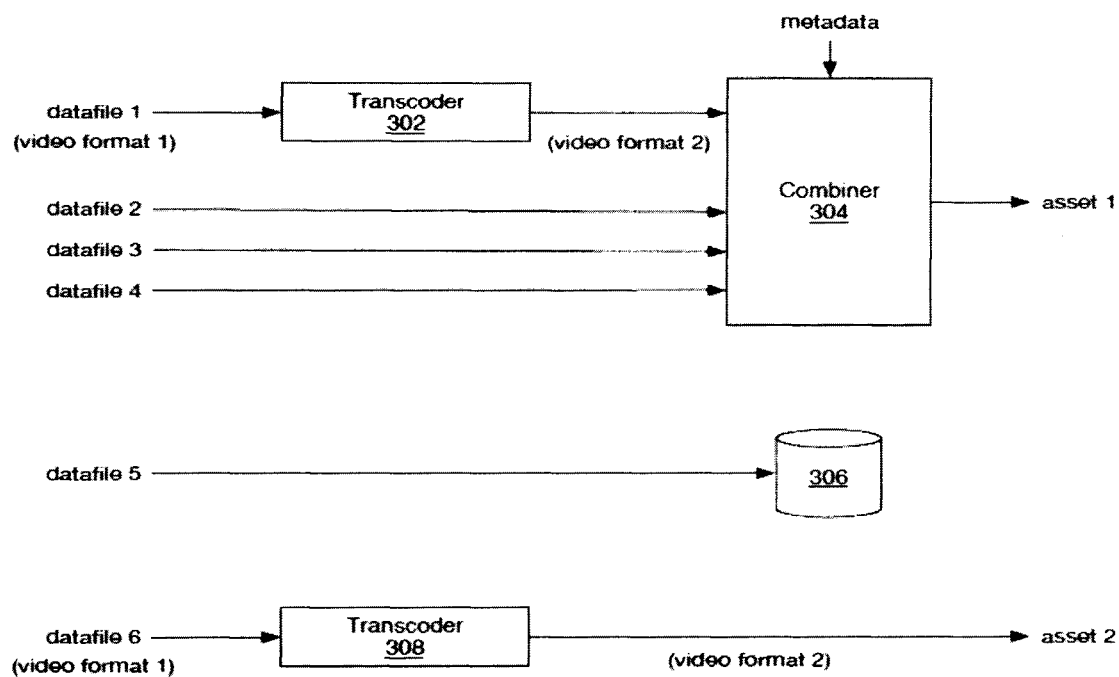

FIG. 3 is a block diagram illustrating an embodiment of processing provided metadata file and data files of a digital media content product to produce digital media content assets. In some embodiments, the example of FIG. 3 illustrates 204 of FIG. 2. The "metadata", "datafile1", "datafile2", "datafile3", "datafile4", "datafile5", and "datafile6" as shown represent individual files received at a digital media servicer provider (e.g., digital media servicer provider 108 of FIG. 1) from a media content provider (e.g., media content provider 104 of FIG. 1). All of the files are associated with a single digital media content product. Provided "datafile1" includes video content. Transcoder 302 converts "datafile1" from a first video format to a second video format. For example, MPEG-2 encoded "datafile1" is converted to H.264 video format. The transcoded "datafile1", "datafile2", "datafile3", and "datafile4" is processed by combiner 304 using "metadata" to produce "asset1." The "asset1" is a digital media content asset. For example, "datafile1" includes a video component of a movie content product (i.e., video and primary audio track), "datafile2" includes a chaptering component of the movie content product, "datafile3" includes a subtitling component of the movie content product, and "datafile4" includes an audio soundtrack component of the movie content product, such as a second language or multi-channel audio. The four data files are processed and combined by combiner 304 as specified in part by the "metadata" to produce an asset ("asset1") containing the feature film portion of the movie content product. In some embodiments, one or more of the data files is processed individually before being provided to combiner 304.

In some embodiments, "asset1" is encoded in a multi-track video format, such as QUICKTIME format of APPLE COMPUTER, INC. For example, combiner 304 processes/combines the data files into a single asset file by including on each of a plurality of different tracks of the multi-track video format data included in and/or derived from one or more of the data files.

In some cases, a data file is individually processed by combiner 304 before being combined into the asset file. For example, "datafile2" contains metadata information specifying how to section "asset1" into chapters, and the specified chaptering information is used to produce a menu of chapters to be included in "asset1." In some embodiments, "datafile2" and/or "metadata" references one or more image files to be used as preview images of the sections/chapters, and the image files are provided for use by combiner 304. In various embodiments, any number files can be processed by combiner 304 to produce the asset. In some embodiments, "asset1" is encrypted after being processed by combiner 304. For example, "asset1" is encrypted using digital rights management.

In the example shown, the provided "datafile5" is stored in storage 306 for possible future use. In some embodiments, storage 306 is included in storage 10 of FIG. 1. In some embodiments, "datafile5" is or may be used in a subsequent version of "asset1." For example, "datafile5" contains closed captioning information associated with "asset1," and "datafile5" is stored for later use when a version of "asset1" with closed captioning information is desired. In some embodiments, "datafile5" is specified to be stored for possible future use by the "metadata." In some embodiments, any received data file not specified for use by "metadata" is stored in storage 306 for possible future use. Transcoder 308 converts "datafile6" from a first video format to a second video format to produce "asset2." In various embodiments, one or more other processing may be performed on "datafile6" to produce the second asset. In the example shown, "asset2" is a trailer associated with the movie content product. In some embodiments, transcoder 308 and transcoder 302 are the same transcoder. In some embodiments, "datafile6" is specified to be used to produce "asset2" by the "metadata" file.

FIGS. 4A-4C are illustrating an example of meta-language tag elements and corresponding data contained in a metadata file that can used to produce one or more digital media content assets. The metadata file is provided along with a plurality of data files. In some embodiments, the elements shown in FIGS. 4A-4C are included in the metadata file in 202 of FIG. 2 and/or the "metadata" file of FIG. 3. Not all of the possible meta-language tag elements are shown. For example, one or more tag elements associated with poster art and/or bonus materials are included in the metadata file but not shown in the Figures. In various embodiments, additional child elements or additional element attributes may exist for any element. Any number of elements may exist. The shown elements of the metadata file are associated with a media content product.

Elements 402 of FIG. 4A include <type>, <title>, <rating>, <cast>, <crew>, and <synopsis>. The <type> element indicates media content type of the media content product. In the example shown, the value "film" indicates the media content product is a feature film. Processing of the metadata file and/or associated data files may depend on the value of the <type> element. The <title> element specifies the title of the media content. The <ratings> element includes a child element <rating> indicating a rating associated with the media content product. For the <rating> element, the "system" attribute specifies the rating system used to rate the media content product, and the "reason" attribute specifies the reason for the rating. The <Synopsis> element specifies a text synopsis of the media content product.

The <cast> element includes child <actor> elements. The <actor> element specifies a character name portrayed in the media content product. For the <actor> element, the "name" attribute specifies the name of the actor that played the character of the <actor> element, the "artist_id" attribute specifies a unique identifier that can be used obtain information about the actor from a database, and the "billing" attribute indicates the billing level of the actor. In the example shown, actor named "Bob" has portrayed a character "Male Lead". Additional information about "Bob" can be obtained from a database using identifier "x", and "Bob" belongs in the "top" billing category. There exists one or more billing categories. One category of billing may be associated with a higher listing/display priority than another billing category. Specification of the "billing" attribute is optional, and when the "billing" attribute is not specified, the actor of the <actor> element is associated with a lowest and/or predetermined billing priority level. A higher billing priority level is associated with a requirement for display and/or a more desirable display positioning. The order of the elements amongst the <actor> elements at least in part indicates a listing/display priority of the elements. In the example shown, the order of the <actor> elements indicates "Bob" should be listed before "Mary" and "Joe", and "Mary" should be listed before "Joe". Any number of <actor> elements may exist.

The <crew> element includes <member> child elements specifying crew member roles. For the <member> element, the "name" attribute is the name of the crew member that performed the crew member role, the "artist_id" attribute specifies a unique identifier that can be used obtain information about the crew member from a database, and the "billing" attribute indicates the billing level of the crew member. The display/listing priority properties associated with the "billing" attribute and the order of <member> elements within the <crew> element are associated with the same priority properties as the corresponding "billing" attribute and the order of <actor> elements described above for the <cast> element. Any number of <member> elements may exist.

The <assets> element 404 of FIG. 4B includes <asset> child elements. An <asset> element specifies a media content asset to be produced using one or more of the provided data files. Each <asset> element includes a "type" attribute that defines the type of asset to be created. The <asset> element includes one or more <data_file> elements that specifies the data files to be used to create the corresponding media content asset. The <data_file> element includes <file_name> child element that specifies the name of the file to be used, and the <data_file> element includes <checksum> child element that specifies the checksum of the corresponding data file. The "type" attribute of <checksum> element specifies the type of checksum used. By using the value of the <checksum> element, it is possible to differentiate between different versions of the data file and verify a correct data file has been provided. The "role" attribute of <data_file> element specifies how to use and/or process the corresponding file to produce the media content asset. For example, different processing rules are associated with different "role" attribute values. In the example shown, the <assets> element specifies two assets should be produced. The "full" type asset is produced using files named "datafile1", "datafile2", "datafile3", "datafile4", "datafile5", and "datafile6." Using processing rules, the "role" attribute value "source" indicates "datafile1" is to be transcoded to a determined video format before being combined/processed with the other data files, and the "role" attribute value "captions" indicates "datafile5" should only be used in producing the asset if closed captioning is to be supported by the asset. The "preview" type asset is produced using a file named "datafile6". Since "datafile6" of a "source" type, "datafile6" is to be transcoded to a determined video format.

The <products> element 406 of FIG. 4C includes a <product> child element. The <territory> element specifies a geographical territory the media content product can be distributed. The "world" value indicates the product can be distributed world wide. The <wholesale_price_tier> element specifies the pricing tier for the media content product. The value of the <wholesale_price_tier> element is used at least in part to determine a price value for the media content product. The <preorder_sales_start_date> element specifies the date on which a pre-order sale for the media content product can begin. The <sales_start_date> element specifies the date on which sale and/or distribution of the media content product can begin. The <sales_end_date> element specifies the date on which sale and/or distribution of the media content product should end. The <cleared_for_sale> element indicates whether the media content product can be sold/distributed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing digital media content, comprising:
receiving from a media content provider a metadata file and a plurality of data files associated with a digital media content that the media content provider desires to make available for download by one or more end users; and
using the metadata file to process the plurality of data files without human intervention to produce prior to download time a downloadable digital media content asset;
wherein the metadata file specifies for each of at least a subset of the plurality of data files how that data file is to be used prior to download time to create prior to download time the downloadable digital media content asset; the metadata file is associated with the digital media content and not with any specific one of said end users; and wherein processing the plurality of data files includes combining together prior to download time at least a portion of each of said at least a subset of the plurality of data files, in a manner indicated by the metadata file, to produce the downloadable digital media content asset; and further comprising making the downloadable digital media content asset available for download by consumers; and
wherein the plurality of data files includes a chaptering metadata file that identifies a plurality of chapters comprising the file downloadable digital media content asset and for each chapter a corresponding portion of the digital media content and one or both of an image and a video clip representative of said corresponding portion of the digital media content, and wherein said chaptering data is parsed and used to generate automatically and without human intervention a chapter menu data for the downloadable digital media content asset.

2. A method as recited in claim 1, wherein receiving the metadata file and the plurality of data files includes receiving at a first instance a first subset of the plurality of data files and receiving at a second instance a second subset of the plurality of data files.

3. A method as recited in claim 1, wherein processing the plurality of data files includes associating at least one of the plurality of data files with a track of a multi-track video format encoding of the downloadable digital media content asset.

4. A method as recited in claim 1, wherein at least one of the plurality of data files is encrypted or converted before using the metadata file to process the plurality of data files.

5. A method as recited in claim 1, wherein the downloadable digital media content asset is encrypted with digital rights management after using the metadata file to process the plurality of data files.

6. A method as recited in claim 1, wherein processing the plurality of data files includes using chaptering information specified in at least one of the plurality of data files to section the downloadable media content asset into chapters.

7. A method as recited in claim 1, wherein using the metadata file to process the plurality of data files includes storing a copy of the plurality of data files.

8. A method as recited in claim 1, further comprising receiving a data file to be stored for possible future use in producing a version of the downloadable digital media content asset.

9. A method as recited in claim 1, wherein processing the plurality of data files includes producing the digital media content asset when one of the plurality of data files is modified, replaced, added, or removed.

10. A method as recited in claim 1, wherein the metadata file and the plurality of data files are received by a digital media service provider from a media content provider.

11. A method as recited in claim 1, wherein receiving the metadata file and the plurality of data files enables a plurality of versions of the downloadable digital media content asset to be produced.

12. A method as recited in claim 11, wherein one of the versions is optimized for storage space efficiently.

13. A method as recited in claim 1, wherein one or more of the following properties of the downloadable digital media content asset is determined using the metadata file:

a content description, a purchase price, a pre-sale start date, a sale date, a sale end date, a release date, a geographical distribution area, and a distribution authorization.

14. A method as recited in claim 1, wherein a requirement for display or ordering of information associated with the downloadable digital media content asset is at least in part determined by one or more of the following: a priority level specified for an element of the metadata file and an ordering of an element of the metadata file within the metadata file.

15. A method as recited in claim 1, wherein providing the downloadable digital media content asset includes making the downloadable digital media content asset available for rental, purchase, or distribution.

16. A method as recited in claim 1, wherein the downloadable digital media content asset is one of at least two digital media content assets associated with a single digital media content product.

17. A system for providing digital media content, comprising:
a communication interface configured to receive from a media content provider a metadata file and a plurality of data files associated with a digital media content that the media content provider desires to make available for download by one or more end users; and
a processor configured to use the metadata file to process the plurality of data files without human intervention to produce prior to download time a downloadable digital media content asset;
wherein the metadata file specifies for each of at least a subset of the plurality of data files how that data file is to be used prior to download time to create prior to download time the downloadable digital media content asset; the metadata file is associated with the digital media content and not with any specific one of said end users; and wherein the processor is configured to process the plurality of data files including by combining together prior to download time at least a portion of each of said at least a subset of the plurality of data files, in a manner indicated by the metadata file, to produce the downloadable digital media content asset; and wherein the processor is further configured to make the downloadable digital media content asset available for download by consumers; and
wherein the plurality of data files includes a chaptering metadata file that identifies a plurality of chapters comprising the file downloadable digital media content asset and for each chapter a corresponding portion of the digital media content and one or both of an image and a video clip representative of said corresponding portion of the digital media content, and wherein said chaptering data is parsed and used by the processor to generate automatically and without human intervention a chapter menu data for the downloadable digital media content asset.

18. A computer readable storage medium for providing digital media content, the computer readable storage medium having encoded thereon computer instructions for:
receiving from a media content provider a metadata file and a plurality of data files associated with a digital media content that the media content provider desires to make available for download by one or more end users; and
using the metadata file to process the plurality of data files without human intervention to produce prior to download time a downloadable digital media content asset;
wherein the metadata file specifies for each of at least a subset of the plurality of data files how that data file is to be used prior to download time to create prior to download time the downloadable digital media content asset; the metadata file is associated with the digital media content and not with any specific one of said end users; and wherein processing the plurality of data files includes combining together prior to download time at least a portion of each of said at least a subset of the plurality of data files, in a manner indicated by the metadata file, to produce the downloadable digital media content asset; and further comprising making the downloadable digital media content asset available for download by consumers; and
wherein the plurality of data files includes a chaptering metadata file that identifies a plurality of chapters comprising the file downloadable digital media content asset and for each chapter a corresponding portion of the digital media content and one or both of an image and a video clip representative of said corresponding portion of the digital media content, and wherein said chaptering data is parsed and used to generate automatically and without human intervention a chapter menu data for the downloadable digital media content asset.

19. A method as recited in claim 1, wherein one or both of said image and said video clip are included in a corresponding one of said plurality of data files.

20. A method as recited in claim 1, further comprising receiving a new or modified one of said plurality of data files and using the metadata file, the new or modified one of said plurality of data files, and one or more of said plurality of data files that is not new or modified to generate or re-generate the digital media content asset.

* * * * *

UNITED STATES PATENT AND TRADEMARK OFFICE
CERTIFICATE OF CORRECTION

PATENT NO. : 8,966,371 B2
APPLICATION NO. : 11/519995
DATED : February 24, 2015
INVENTOR(S) : Jason Robert Suitts et al.

It is certified that error appears in the above-identified patent and that said Letters Patent is hereby corrected as shown below:

In the drawings
Please replace sheet 1 (Fig. 1) of the above identified patent with the replacement sheet 1 (Fig. 1) as shown on attached sheet;

Please replace sheet 2 (Fig. 2) of the above identified patent with the replacement sheet 2 (Fig. 2) as shown on attached sheet;

Please replace sheet 3 (Fig. 3) of the above identified patent with the replacement sheet 3 (Fig. 3) as shown on attached sheet;

Please replace sheet 4 (Fig. 4A) of the above identified patent with the replacement sheet 4 (Fig. 4A) as shown on attached sheet;

Please replace sheet 5 (Fig. 4B) of the above identified patent with the replacement sheet 5 (Fig. 4B) as shown on attached sheet;

Please replace sheet 6 (Fig. 4C) of the above identified patent with the replacement sheet 6 (Fig. 4C) as shown on attached sheet.

Signed and Sealed this
Twenty-seventh Day of October, 2015

Michelle K. Lee
*Director of the United States Patent and Trademark Office*

```
<type>film</type>
<title>Movie Title</title>
<ratings>
     <rating system="mpaa" reason="Drug content">PG-13</rating>
</ratings>
<cast>
     <actor name="Bob" artist_id="x" billing="top">Male Lead</actor>
     <actor name="Mary" artist_id="y" billing="top">Female Lead</actor>
     <actor name="Joe" artist_id="z">Supporting Actor</actor>
</cast>
<crew>
     <member name="Rob" artist_id="w" billing="top">Director</member>
</crew>
<synopsis>"Synopsis Text"</synopsis>
```

402

FIG. 4A

```xml
<assets>
    <asset type="full">
        <data_file role="source">
            <file_name>datafile1</file_name>
            <checksum type="md5">a</checksum>
        </data_file>
        <data_file role="chapters">
            <file_name>datafile2</file_name>
            <checksum type="md5">b</checksum>
        </data_file>
        <data_file role="subtitle">
            <file_name>datafile3</file_name>
            <checksum type="md5">c</checksum>
        </data_file>
        <data_file role="audio">
            <file_name>datafile4</file_name>
            <checksum type="md5">d</checksum>
        </data_file>
        <data_file role="captions">
            <file_name>datafile5</file_name>
            <checksum type="md5">e</checksum>
        </data_file>
    </asset>
    <asset type="preview">
        <data_file role="source">
            <file_name>datafile6</file_name>
            <checksum type="md5">f</checksum>
        </data_file>
    </asset>
</assets>
```

404

FIG. 4B

```
<products>
    <product>
        <territory>world</territory>
        <wholesale_price_tier>3</wholesale_price_tier>
        <preorder_sales_start_date>2006-02-10</preorder_sales_start_date>
        <sales_start_date>2006-03-12</sales_start_date>
        <sales_end_date></sales_end_date>
        <cleared_for_sale>true</cleared_for_sale>
    </product>
</products>
```

406

FIG. 4C